United States Patent [19]

Patel

[11] Patent Number: 6,029,755
[45] Date of Patent: Feb. 29, 2000

[54] CONDUCTIVE MEDIUM FOR OPENHOLE LOGGING AND LOGGING WHILE DRILLING

[75] Inventor: Arvind D. Patel, Houston, Tex.

[73] Assignee: M-I L.L.C., Houston, Tex.

[21] Appl. No.: 09/021,013

[22] Filed: Feb. 9, 1998

Related U.S. Application Data

[63] Continuation-in-part of application No. 09/013,454, Jan. 26, 1998, which is a continuation-in-part of application No. 09/004,267, Jan. 8, 1998.

[51] Int. Cl.$^7$ .............................. C09K 7/06; E21B 21/00; E21B 49/00
[52] U.S. Cl. ..................... 175/50; 73/152.03; 166/254.2; 507/103
[58] Field of Search ................................. 175/50, 65, 66; 507/103; 166/254.2; 73/152.03

[56] References Cited

U.S. PATENT DOCUMENTS

| | | | |
|---|---|---|---|
| H1611 | 11/1996 | Patel ......................................... | 507/103 |
| 3,899,431 | 8/1975 | Hayes et al. .............................. | 252/8.5 |
| 4,647,859 | 3/1987 | Son et al. ................................. | 324/323 |
| 4,747,969 | 5/1988 | Rupilius et al. . | |
| 4,830,765 | 5/1989 | Perricone et al. . | |
| 4,941,981 | 7/1990 | Perricone et al. . | |
| 4,950,995 | 8/1990 | Falk ....................................... | 324/323 |
| 4,963,273 | 10/1990 | Perricone et al. . | |
| 4,964,615 | 10/1990 | Mueller et al. ....................... | 252/8.551 |
| 5,057,234 | 10/1991 | Bland et al. . | |
| 5,072,794 | 12/1991 | Hale et al. ................................ | 175/50 |
| 5,120,708 | 6/1992 | Melear .................................... | 507/126 |
| 5,141,920 | 8/1992 | Bland et al. ............................ | 507/136 |
| 5,628,833 | 3/1997 | McCormack et al. .................... | 134/26 |

FOREIGN PATENT DOCUMENTS

| | | |
|---|---|---|
| 449257A2 | 10/1991 | European Pat. Off. . |
| 495579A3 | 7/1992 | European Pat. Off. . |
| 0 652 271 | 5/1995 | European Pat. Off. . |
| 374671A1 | 6/1996 | European Pat. Off. . |
| 0 730 018 | 9/1996 | European Pat. Off. . |
| 730018A1 | 9/1996 | European Pat. Off. . |
| 3842703A1 | 6/1990 | Germany . |
| 751191 | 6/1956 | United Kingdom . |
| 2223255 | 4/1990 | United Kingdom . |
| 2251447 | 7/1992 | United Kingdom . |
| 2252993 | 8/1992 | United Kingdom . |
| 2283036 | 4/1995 | United Kingdom . |
| WO89/01491 | 2/1989 | WIPO . |
| WO90/06981 | 6/1990 | WIPO . |
| WO93/16145 | 8/1993 | WIPO . |
| WO93/23491 | 11/1993 | WIPO . |
| WO94/16030 | 7/1994 | WIPO . |
| 96/19545 | 6/1996 | WIPO . |
| WO96/19545 | 6/1996 | WIPO . |

OTHER PUBLICATIONS

Dickey, Parke A.; Petroleum Development Geology, 2nd Ed; Penn Well Books before 1988, pp. 57–83.
The Dow Chemical Company; Physical Properties of Dowanol Glycol Ethers and Acetates; table; Jun. 1995.
The Dow Chemical Company; Material Safety Data Sheet, Oct. 20, 1997.
The Dow Chemical Company; Product Information—Dowanol DPNB, Apr. 1997.
The Dow Chemical Company; Production Information—Dowanol PNB, Apr. 1997.
The Dow Chemical Company; The Glycol Ethers Handbook, Oct. 1993.
Chemical Abstract Services Search Report, Oct. 27, 1997.
Aldrich Katalog Handbuch Feinchemikalien, Aldrich GmbH & Co. KG, Steinheim/DE 1994, p. 557.
Translation of PCT document No : WO90/06890, published : Jun. 28, 1990.

*Primary Examiner*—George Suchfield
*Attorney, Agent, or Firm*—Arnold White & Durkee

[57] ABSTRACT

A conductive fluid has been formulated for use in a method of electrically logging subterranean wells. The conductive fluid includes a miscible combination of an oleaginous fluid, a water soluble alcohol, and an electrolytic salt. The electrolytic salt or brine of the salt is present in a concentration sufficient to permit the electrical logging of the subterranean well. The medium may further include gelling agent, weight material, surfactant, or corrosion inhibitors. The oleaginous fluid may preferably be a preferentially-oil-soluble glycol alone or in combination with mineral oil, vegetable oil, synthetic oil, silicone oil or combinations and mixtures of these. The alcohol may preferably be a water soluble glycol or glycol ether such as ethylene glycol, diethylene glycol, propylene glycol and the like. The electrolytic salt or brine may be an inorganic or organic salt, examples of which include sodium chloride, sodium bromide, potassium chloride, ammonium chloride, magnesium chloride, calcium chloride, calcium bromide, sodium acetate, potassium acetate, sodium citrate, or combinations thereof.

24 Claims, No Drawings

CONDUCTIVE MEDIUM FOR OPENHOLE LOGGING AND LOGGING WHILE DRILLING

This is a continuation-in-part of co-pending application entitled "Water Soluble Invert Emulsions" filed on Jan. 26, 1998 (U.S. application Ser. No. 09/013,454) which is a continuation-in-part of the co-pending application entitled "Water Soluble Invert Emulsions" filed on Jan. 8, 1998 (U.S. application Ser. No. 09/004,267).

BACKGROUND OF THE INVENTION

1. Field of the Invention

The present invention is generally directed to a conductive fluid medium useful in the openhole wireline logging of subterranean wells and in logging-while-drilling. Further, the present invention is directed to a method of using this medium in electrical wireline logging of oil and gas wells.

2. Background

The use of wireline well logs is well known in the art of drilling subterranean wells and in particular oil and gas wells. A wireline log is generated by lowering a logging tool down the well on a wireline. The tool is slowly brought back to the surface and the instruments on the logging tool take measurements that characterize the formations penetrated by the well in addition to other important properties of the well. Electrical logs and other wireline log techniques are depended upon in the oil and gas exploration industry to determine the nature of the geology and the reservoir properties of the petroleum bearing formations penetrated by the well. Further, wireline well logs are often the only record of the formations penetrated by the well available for correlation amongst different wells in a particular field.

When an electrical wireline log is made of a well, electrodes on the well logging tool are in contact with wellbore fluid or filter cake and hence the formation rocks through which the well has penetrated. An electrical circuit is created and the resistance and other electrical properties of the circuit may be measured while the logging tool is retracted from the well. The resulting data is a measure of the electrical properties of the drilled formations verses the depth of the well. Another common measurement made with an electrical log, besides resistivity, is the spontaneous or self potential. One of skill in the art of well logging and electrical logging in particular should understand how to interpret the results of such measurements to determine the presence or absence of petroleum or gas, the porosity of the formation rock and other important properties of the well. Further information in this regard can be found in the book entitled "Essentials of Modem Open-hole Log Interpretation" by John T. Dewan the contents of which are hereby incorporated herein by reference, and other similar reference material.

An alternative or supplement to wireline logging involves logging tools placed in specialized drill collar housing and run in the drill string near the bit. This technique is known as logging-while-drilling (LWD) or formation-evaluation-while-drilling (FEWD) Measurements such as electrical resistivity can be thereby taken and stored down hole for later retrieval during a "tripping out" of the drill string, or transmitted to the surface via mud-pulse telemetry. Such techniques should be known to one of skill in the art of well drilling and subterranean well logging.

The use of oil-based muds and drilling fluids has become increasingly popular since their introduction of the technology in the 1950's. Innovations in oil-based muds and drilling fluids are of on-going importance with the development of environmentally friendly drilling fluids and fluids having other special characteristics. Oil-based muds offer advantages over water-based muds in many drilling situations. In particular, oil-based muds are known in the art to provide excellent shale inhibition, borehole stability, lubricity, thermal stability, tolerance of contamination and ease of maintenance. Despite the many benefits of utilizing oil-based muds and drilling fluids, they have disadvantages. One such disadvantage addressed by the present invention is that normal resistivity and self potential measurements cannot be taken when the well has been drilled with a conventional oil-based mud or drilling fluid due to the non-conductive nature of the oil-based drilling fluids and muds. Of the many attempts to date, none have met with much success or commercial acceptance in the subterranean well drilling art. Thus there exists an on-going need and desire for drilling fluids and drilling muds that are oil-based and yet allow the taking of wireline electrical logs of the well and electrical-logging-while-drilling.

SUMMARY OF THE INVENTION

The present invention is generally directed to providing an oil-base medium suitable for electrically logging a subterranean well. The medium in its continuous phase includes an oleaginous fluid, a water soluble alcohol and an electrolytic salt. The continuous phase is in contact with the logging tool and the wellbore of the well. The continuous phase may have dispersed within it fluid droplets or solid particles immiscible with the continuous phase. The oleaginous fluid may be a preferentially-oil-soluble glycol or such a glycol in combination with a mineral oil, vegetable oil, synthetic oil, silicone oil, or combinations of these fluids. The alcohol is water soluble and at least partially soluble in the oleaginous fluid. Examples of such alcohol may include ethylene glycol, diethylene glycol, propylene glycol. The electrolytic salt or brine should be selected so that it is at least partially soluble in the mixture of oleaginous fluid and alcohol. Suitable salts or brines include magnesium chloride, sodium chloride, sodium bromide, potassium chloride, ammonium chloride, calcium chloride, calcium bromide, or combinations thereof. Organic salts may also be utilized in place of or in addition to the aforementioned salts and brines and in particular salts such as sodium acetate, potassium acetate or sodium citrate may be used. The logging medium may also include viscosifier or gelling agent, such as clays, organophilic clays, polymers, polyamides, polymer emulsions or combinations thereof and the like. In addition, the logging medium of the present invention may have suspended within it a weight material such as hematite, magnetite, iron oxides, ilmenite, barite, siderite, celestite, dolomite, calcite, manganese oxides, halites or combinations of these. The continuous phase of the logging medium comprises the oleaginous fluid together with whatever alcohol, salt, brine or other materials that may be dissolved therein. These other materials may include corrosion inhibitors, emulsifiers or fluid loss additives.

Another embodiment of the present invention, includes drilling a subterranean well with the fluid of the present invention serving as the medium for logging-while-drilling via a suitable tool in the drill string. Another embodiment includes drilling the subterranean well with a drilling fluid in which the logging medium of the present invention is a component. In such an embodiment, the logging medium should be in sufficient concentration so as to enable one to make electrical log measurements of the subterranean well.

The present invention is also directed to a process whereby electric logging is carried out in a wellbore containing the fluid medium described herein. The composition of the medium includes an oleaginous fluid, a water soluble alcohol and an electrolytic salt. In addition, the medium may include gelling agent and weight material, and optionally a corrosion inhibitor. Alternatively, the medium may also include surfactant, emulsifier, wetting agent, fluid loss control agent or combinations of these in addition to the components previously disclosed above.

DESCRIPTION OF ILLUSTRATIVE EMBODIMENTS

The following terms and phrases are used herein and are intended to have the following meaning:

"medium" or "logging medium" or "fluid medium" mean any fluid or liquid medium which is sufficiently conductive to allow the wireline electrical logging of a subterranean well;

"oleaginous fluid" is a fluid which has the nature or qualities of oil and is miscible with oil at 20° C.;

"nonoleaginous fluid" is a fluid which is not miscible with oil at 20° C.;

"water soluble alcohol" is a mono- or poly-functional alcohol (i.e. mono-hydric alcohol, di-hydric alcohol or poly-hydric alcohol, polyglycol, glycol ether, etc.) which is miscible with fresh water at 20° C.

"water soluble glycol" is a glycol or glycol ether which is miscible with fresh water at 20° C.;

"preferentially-oil-soluble glycol" is a glycol or glycol ether which at 20° C. is: 1) miscible at all proportions with oil, specifically with ISOPAR-M, but 2) has limited miscibility with water, specifically less than 10% by volume of the glycol ether is miscible in fresh water, that is to say 10% by volume of the glycol ether mixed with fresh water results in two phases. ISOPAR-M is a isoparaffinic hydrocarbon mineral oil supplied by Exxon Chemical;

"electrolytic salt" is a organic or inorganic salt or brine of such salts that is at least partially soluble or miscible in the logging medium of the present invention and imparts conductivity properties to said medium such that electrical logging can take place;

"conductive medium" is any fluid medium that permits the taking of electrical well logging measurements, and in particular allows the taking of resistivity and self or spontaneous potential measurements of the well.

The present invention is directed to a method of logging a subterranean well and to a well logging medium useful in said method. In one illustrative embodiment, the method includes placing into the subterranean well a logging medium. The logging medium includes an oleaginous fluid, a water soluble alcohol and an electrolytic salt, the salt being present in a concentration so as to permit the electrical logging of the well. A second illustrative embodiment of the method of the present invention includes the drilling of a subterranean well with an oleaginous-based drilling fluid, placing into the subterranean well a logging medium of the present invention and displacing the oleaginous-based drilling fluid. In such an embodiment the displacement of the oleaginous-based drilling fluid enables one to take electrical log measurements of the subterranean well. In yet a third illustrative embodiment, the method includes placing into a subterranean well a fluid medium of the present invention and drilling the subterranean well with a drilling fluid in which the medium of the present invention is a component. The medium of the present invention should be present in the continuous phase of the drilling fluid in a concentration such that electrical logging of the well is possible. The use of drilling fluids and or muds in the drilling of a subterranean well should be within the knowledge of one of skill in the art as indicated in commonly available books such as *Petroleum Development Geology,* 3rd Ed. by Parke A. Dickey; *Nontechnical Guide to Petroleum Geology, Exploration, Drilling and Production,* by Norman J. Hyne; both available from PennWell Books and *Composition and Properties of Drilling and Completion Fluids,* 5th Ed. by H. C. H. Darley and George R. Gray available from Gulf Publishing Company, all of the contents of which are hereby incorporated herein by reference.

The logging medium, also referred to herein as simply "medium", useful in the above methods includes a miscible combination of an oleaginous fluid; a water soluble alcohol and an electrolytic salt or brine. Such a medium should be sufficiently conductive so as to allow one skilled in the art to take electrical log measurements of the subterranean well. The medium may further comprise a gelling agent and weight material and optionally included corrosion inhibitor as are discussed below. Another illustrative medium of the present invention may also include components such as surfactant, emulsifier, wetting agent, fluid loss control agent or combinations of these in addition to the previously set forth components.

Suitable oleaginous fluids for use in the present invention include preferentially-oil-soluble glycol alone or in combinations with mineral oil, vegetable oil, synthetic oil, silicone oil, or mixtures of these or similar materials. Examples of vegetable oil include corn oil, soy bean oil, sunflower oil, safflower oil, rapeseed oil, peanut oil, cottonseed oil, rice bran oil, castor bean oil, linseed oil and the like. A synthetic oil may be selected from the group including esters, ethers, dialkyl carbonates, acetals or synthetic hydrocarbons which are suitable for such purposes. Examples of such compounds include, polyalphaolefins, polyethylene glycol, monocarboxylic acid esters of $C_2$ to $C_{12}$ alkanol such as those disclosed in U.S. Pat. No. 5,232,910, the contents of which are incorporated herein by reference, dialkyl carbonates in which the alkyl groups have more than 2 carbon atoms, acetals in which the alkoxy groups have more than 2 carbon atoms and the like. Examples of silicone oil that may be used in the formulation of the present invention include dimethylsiloxane polymers, also called dimethyl silicone fluids, such as those described in U.S. Pat. No. 5,707,939 the contents of which are hereby incorporated herein by reference. Illustrative examples of preferentially-oil-soluble glycols include propylene glycol n-butyl ether (PNB); dipropylene glycol n-butyl ether (DPNB); tripropylene glycol n-butyl ether (TPNB); tetrapropylene glycol n-butyl ether (TtPNB); pentapropylene glycol n-butyl ether (PnPNB); hexapropylene glycol n-butyl ether (HxPNB); heptapropylene glycol n-butyl ether (HpPNB), and the analogous tert-butyl ethers. In another embodiment dipropylene glycol n-butyl ether or tripropylene glycol n-butyl ether have been preferably used. The present invention may be carried out using a mixture of preferentially-oil-soluble glycols. For example, such a mixture may include tripropylene glycol n-butyl ether, tetrapropylene glycol n-butyl ether, pentapropylene glycol n-butyl ether and hexapropylene glycol n-butyl ether herein referred to as polypropylene glycol n-butyl ether (PPNB). An example of such a mixture is commercially available from Shrieve Chemical Co. under the name Drill-Col 545-X which is also referred to herein as PPNB. The use of such fluids in the formulation of drilling fluids and drilling muds is described in greater detail in co-pending U.S. patent application Ser. No. 09/004,267 filed on Jan. 8, 1998 and entitled "Water Soluble Invert Emulsions" the contents of which are hereby incorporated herein by reference. One of skill in the art should understand and be capable of adjusting the content of the oleaginous fluid content so as to achieve the results of the present invention.

The water soluble alcohol component of the logging medium of the present invention may be a mono-hydric, di-hydric or poly-hydric alcohol or a mono-hydric, di-hydric or poly-hydric alcohol having poly-functional groups. Examples of such compounds include aliphatic mono-alcohols, (i.e. methanol, ethanol, propanol, etc.), aliphatic diols (i.e. glycols, 1,3-diols, 1,4-diols, etc.), aliphatic poly-ols (i.e. tri-ols, tetra-ols, etc.) polyglycols (i.e. polyethylenepropylene glycols, polypropylene glycol, polyethylene glycol, etc.), glycol ethers (i.e. diethylene glycol ether, triethylene glycol ether, polyethylene glycol ether, etc.) and other such similar compounds that may be found useful in the practice of the present invention. Such compounds should be selected so as to be miscible in fresh water at 20° C. and at least partially miscible in the oleaginous fluid component described above. In addition, the alcohol should be capable of at least partially solubilizing the electrolytic salt or brine in the continuous phase of the well logging medium. In one illustrative embodiment, the alcohol has a molecular weight of less than about 200 AMU. In another illustrative embodiment, the alcohol may be selected from glycols and glycol ethers such as ethylene glycol, diethylene glycol, triethylene glycol, propylene glycol, butylene glycol and mixtures of these. The alcohol may constitute up to about 95% by volume of the well logging medium and preferably is present in an amount from about 5% to about 90% by volume. One of skill in the art should understand and be capable of adjusting the content of the alcohol content so as to achieve the results of the present invention.

The electrolytic salt component of the well logging medium of the present invention is an organic or inorganic salt or brine solution selected so that there is at least partial mutual solubility between the oleaginous liquid, the alcohol and the salt or brine. That is to say, the electrolytic salt should be selected so as to permit the taking of electrical logs of subterranean wells in which the fluid medium of the present invention has been placed. As previously mentioned, the purpose of the electrolytic salt is to impart conductivity to the well logging medium. It should be well known to one of skill in the art that the solubilization of salts in a fluid can impart electrical conductivity to the fluid. In one embodiment of the present invention the electrolytic salt is selected from the alkali and alkaline earth halides and preferably is selected from salts such as sodium chloride, sodium bromide, calcium chloride, calcium bromide, potassium chloride, ammonium chloride, magnesium chloride or mixtures and combinations of these. Alternatively, organic salts may be used as or included with the electrolytic salts, such organic salts may include sodium acetate, potassium acetate, sodium citrate or combinations thereof. The well logging medium of the present invention should have an electrolytic salt concentration that is sufficient to enable the electrical logging of a subterranean well in which the medium is present. One of ordinary skill in the art should understand and be able to adjust the conductivity of the well logging medium of the present invention by selecting or by increasing or decreasing the concentration of the electrolytic salt so as to achieve the results of the present invention.

As previously noted above, the logging medium of the present invention may further contain additives depending upon it's desired end use so long as the additives do not interfere with the properties of the composition described herein. For example, wetting agents, organophilic clays, viscosifiers, weighting agents, bridging agents, fluid loss control agents, and corrosion inhibitors may be added to the compositions of this invention so as to impart additional functional properties. The addition of such agents should be well known to one of skill in the art of formulating drilling fluids, drilling muds and other fluids and media used in subterranean wells.

Wetting agents and emulsifiers that may be suitable for use in this invention include crude tall oil, oxidized crude tall oil, surfactants, organic phosphate esters, modified imidazolines and amidoamines, alkyl aromatic sulfates and sulfonates, and the like, and combinations or derivatives of these. VERSAWET™ and VERSACOAT™ and NOVAMUL™ are examples of commercially available emulsifiers manufactured and distributed by M-I, L.L.C. that may be used in this invention. Silwet L-77, L-7001, L7605 and L-7622 are examples of commercially available surfactants and wetting agents manufactured and distributed by Union Carbide Chemical Company Inc.

Organophilic clays, normally amine treated clays, may be useful as viscosifiers in the fluid compositions of the present invention. Other viscosifiers and gellants, such as oil soluble polymers, polyamide resins, polycarboxylic acids and soaps can also be used. Attapulgite clay and sepiolite clay may also be used as viscosifiers. The amount of viscosifier used in the composition can vary depending upon the end use of the composition. However, normally about 0.1% to 6% by weight range are sufficient for most applications. VG-69™ and VG-PLUS™ are organoclay materials distributed by M-I, L.L.C., and VERSA-HRP™ is a polyamide resin material manufactured and distributed by M-I, L.L.C., that may be used in this invention.

Weighting agents or density materials suitable for use in this invention include hematite, magnetite, iron oxides, ilmenite, barite, siderite, celestite, dolomite, calcite, manganese oxides, halites and the like. The quantity of such material added, if any, depends upon the desired density of the final composition. Typically, weight material is added to result in a density of up to about 22 pounds per gallon. The weight material is preferably added to achieve a density of up to 20 pounds per gallon and most preferably up to 19.5 pounds per gallon.

Fluid loss control agents typically act by coating the walls of the well. Suitable fluid loss control agents which may find utility in this invention include modified lignites, asphaltic compounds, gilsonite, organophilic humates or tannins prepared by reacting humic acid or tannic acid with amides or polyalkylene polyamines, and latex polymers. Typically, fluid loss control agents are added in amounts less than about 10% and preferably less than about 5% by weight of the fluid.

Corrosion inhibitors may also be added to the drilling fluid compositions of this invention to control the corrosion of the drilling equipment used during the drilling operation. Depending upon the type of corrosion encountered, the corrosion inhibitor may be organic or inorganic or some combination thereof. Illustrative examples of such corrosion inhibitors include phosphates, silicates, borates, zinc compounds, organic amines, benzoic acid, and benzoic acid derivatives, phosphate esters, heterocyclic nitrogen and sulfur compounds, organic acids and the like. Examples of commercially available corrosion inhibitors include sodium benzoate and benzotriazole.

In view of the above, one of skill in the art should appreciate the usefulness of the above described compositions. Further one of skill in the art should recognize that the compositions of the present invention may be used as a drilling fluid or drilling mud or as a component of a drilling fluid or drilling mud. The use of drilling fluids and drilling muds should be within the skill of one in the well drilling arts and the usefulness of the present invention should be apparent to such a person.

The following examples are included to demonstrate preferred embodiments of the invention. It should be appreciated by those of skill in the art that the techniques and compositions disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

GENERAL INFORMATION RELEVANT TO THE EXAMPLES

These tests were conducted in accordance with the appropriate published API procedures and in particular in API Bulletin RP 13B-2, 1990, the contents of which are hereby incorporated herein by reference. The following abbreviations are used in describing the following examples:

"DPNB" is dipropylene glycol n-butyl ether.

"DEG" is diethylene glycol.

"TPNB" is tripropylene glycol n-butyl ether.

"HA" means a heat aged fluid.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"GELS" is a measure of the suspending characteristics, or the thixotropic properties of a drilling fluid, measured in pounds per 100 square feet (lb/100 ft$^2$).

Conductivity for each sample was measured in microsiemens ($\mu$s/cm) using a traceable conductivity meter from Fischer Scientific Co.

EXAMPLE 1

A fluid illustrative of the present invention was formulated as follows:

| Formulation 1 | |
| --- | --- |
| DPNB | 215 g |
| DEG | 45 g |
| NaBr Brine (12.5 lb./gal.) | 8.62 g |
| VG-PLUS | 15.0 g |
| VERSA HRP | 2.5 g |
| Barite | 250 g |

In the above table, the DPNB and DEG glycol ethers are available from Dow Chemical; VG-PLUS is an organophilic clay available from M-I, L.L.C.; VERSA HRP is a polya mide resin available from M-I, L.L.C.; and all other components are technical grade chemicals commonly available.

The above formulation was mixed on a Silverson mixer for 10 minutes. The following properties for Formulation 1 were obtained at room temperature.

| | |
| --- | --- |
| PV | 17 |
| YP | 2 |
| GELS | |
| 10 sec. | 4 |
| 10 min. | 5 |
| Conductivity $\mu$s/cm | 80 |

The above formulation was combined with 2.0 g of VERSAMOD, 25 g Rev Dust and 7 g of DUROGEL (sepiolite clay). VERSAMOD is a gellant available commercially from M-I, L.L.C. The mixture was further sheared on a Silverson mixer at 8000 rpm for 3 minutes. The following properties were measured.

| | |
| --- | --- |
| PV | 22 |
| YP | 14 |
| Gels | |
| 10 sec. | 13 |
| 10 min. | 20 |
| Conductivity $\mu$s/cm | 90 |

Upon review one of skill in the art should recognize that the above results indicate that conductive fluids useful in the logging of subterranean well can be prepared using the principles of this invention.

EXAMPLE 2

A fluid illustrative of the present invention was formulated as follows:

| Formulation 2 | |
| --- | --- |
| DPNB | 200 g |
| DBG | 40 g |
| NaBr Brine (12.5 ppg solution) | 8 g |
| DUROGEL | 10 g |
| Barite | 250 g |

In the above table, the DPNB and DEG glycol ethers are available from Dow Chemical; DUROGEL is a sepiolite clay available from M-I, L.L.C.; and all other components are technical grade chemicals commonly available.

The above formulation was mixed on Silverson mixer at 8000 rpm for 10 minutes. The above fluid was heat aged at 150° F. for 16 hours. The following initial and heat aged properties were measured for Formulation 2:

| | Initial | HA at 150° F. |
| --- | --- | --- |
| PV | 23 | 28 |
| YP | 8 | 18 |

-continued

|  | Initial | HA at 150° F. |
|---|---|---|
| GELS | | |
| 10 sec. | 8 | 12 |
| 10 min. | 9 | 15 |
| Conductivity μs/cm | 75 | 64 |

Upon review one of skill in the art should recognize that the above results indicate that conductive fluids useful in the logging of subterranean wells can be prepared using the principles of this invention.

EXAMPLE 3

The following example illustrates the inhibition of shale hydration of the fluids of the present invention.

About 10 g of active shale was added to a portion of the Formulation 2 fluid after which the mixture was heat aged at 150° F. for about 90 minutes. After heat aging, the mixture was screened through 80 mesh screen and the resulting shale particles were washed with petroleum ether and dried. The recovered shale was weighed. As a control experiment, 10 g of active shale was added to deionized water (D.I. $H_2O$) and treated in a similar manner. The following results were obtained:

| Fluid | D.I. $H_2O$ | Formulation 2 |
|---|---|---|
| % recovery | 0% (all dispersed) | 100% |

Upon review of the above results, one of skill in the art should understand that a fluid formulated in accordance to the present invention inhibits the hydration of shale. Further such a skilled person should appreciate that the fluids of the present invention may be used in the electrical logging of a subterranean well while maintaining the stability of shales exposed to the fluid.

EXAMPLE 4

The following example illustrates the oil-miscible nature of the fluids formulated in accordance with the principles of the present invention.

Portions of the Formulation 2 fluid were treated with 3% of each I.O. $C_{16}$–$C_{18}$ synthetic hydrocarbon and isopropyl palmitate and the properties were measured on these fluids after mixing for 10 minutes. IO $C_{16}$–$C_{18}$ is a mixture of predominately $C_{16}$ and $C_{18}$ olefins available from AMOCO Chemicals.

|  | 3% IO $C_{16}$–$C_{18}$ | 3% IO $C_{16}$—$C_{18}$ + 3% IP-Palmitate |
|---|---|---|
| PV | 27 | 26 |
| YP | 16 | 17 |
| GELS | | |
| 10 sec. | 10 | 11 |
| 10 min. | 10 | 12 |
| Conductivity μs/cm | 56 | 55 |

In view of the above results, one of skill in the art should understand that the conductive fluids formulated in accordance with this invention have miscibility with various oleaginous fluids. Further such a skilled person should appreciate that the medium of the present invention may be used in the electrical logging of a subterranean well drilled with it as drilling fluid.

EXAMPLE 5

The following illustrative example shows that the fluids of the present invention are compatible with conventional drilling mud components and additives. The following two Formulations were made:

| Formulation 3 | | Formulation 4 | |
|---|---|---|---|
| TPNB | 124 g | TPNB | 124 g |
| DEG | 104 g | DBG | 104 g |
| NaBr Brine | 20 g | NaBr Brine | 20 g |
| (12.5 ppg solution) | | (12.5 ppg solution) | |
| | | DUROGEL | 5 g |
| | | Silwet-7622 | 4 g |
| | | Emphos-222 | 1.0 g |
| | | Barite | 250 g |

In the above table, the TPNB and DEG glycol ethers are available from Dow Chemical; DUROGEL is a sepiolite clay available from M-I, L.L.C.; Silwet-7622 is a surfactant/wetting agent available from Union Carbide Chemical Company Inc.; Emphos-222 is a phosphate ester surfactant available from Witco Chemicals; and all other components are technical grade chemicals commonly available.

Formulation 3 fluid has a conductivity of about 201 μs/cm while the Formulation 4 fluid has conductivity of about 182.4 μs/cm.

The Formulation 4 fluid was heat aged at 150° F. for 4 hours. The following heat aged properties were measured.

| PV | 57 |
|---|---|
| YP | 14 |
| GELS | |
| 10 sec. | 8 |
| 10 min. | 10 |
| Conductivity μs/cm | 157 |

Upon review of the above results, one of ordinary skill in the art should understand that the conductivity of the fluids of this invention can be varied by adjustment of water soluble glycol and salt content of the fluid, while yet maintaining satisfactory viscosity and gel characteristics.

EXAMPLE 6

The following comparative example is illustrative of the properties and characteristics of a conventional inhibitive invert emulsion oil base fluid. The conventional inhibitive invert emulsion oil-based fluid was prepared according to the following formulation:

| Formulation 5 | |
|---|---|
| LVT-200 | 167 g |
| Lime | 2.0 |
| VG-Plus | 8.0 |

-continued

| Formulation 5 | |
|---|---|
| VERSACOAT | 4.0 |
| VERSAWET | 2.0 |
| CaCl$_2$ Brine (25%) | 70 g |
| Barite | 290 |

In the above table LVT-200 is a mineral oil available from Conoco; VG-PLUS is an organophilic clay available from M-I, L.L.C.; VERSACOAT is a surfactant package available from M-I, L.L.C.; VERSAWET is a wetting agent available from M-I, L.L.C.; and all other components are technical grade chemicals commonly available.

The above conventional invert emulsion oil-based fluid was prepared by mixing the materials in order shown above on a Hamilton Beach mixer. The following properties were measured at room temperature initially and after heat aging at 150° F. for 16 hours.

| | Initial | HA/150° F. |
|---|---|---|
| PV | 24 | 28 |
| YP | 7 | 15 |
| GELS | | |
| 10 sec. | 6 | 9 |
| 10 min. | 9 | 12 |
| Conductivity μs/cm | 0 | 0 |

Given the above results, one of ordinary skill in the art would understand that that the conventional inhibitive oil base fluids are non-conductive when compared with fluids of this invention.

EXAMPLE 7

A fluid illustrative of the present invention was formulated as follows:

| Formulation: 6 | |
|---|---|
| PNB | 200.0 g |
| Propylene glycol | 19.0 g |
| MgCl$_2$ hexahydrate | 1.0 g |
| Water | 2.0 g |

The above fluid has conductivity of 3.86 μs/cm. The above fluid was mixed with 7.0 g of DUROGEL and 150 g of barite. It was then mixed on a Silverson mixer at 8000 rpm for five minutes. The following Theological properties were measured initially and after heat aging at 150° F. for 16 hours.

| | Initial | HA/150° F./16 hours |
|---|---|---|
| PV | 14 | 16 |
| YP | 12 | 7 |

-continued

| | Initial | HA/150° F./16 hours |
|---|---|---|
| Gels | | |
| 10 sec | 7 | 7 |
| 10 min | 10 | 8 |
| Conductivity μs/cm | 5.86 | 5.34 |

Upon review one of skill in the art should recognize that the above results indicate that conductive fluids useful in the logging of subterranean wells can be prepared using the principles of this invention.

EXAMPLE 8

A fluid illustrative of the present invention was formulated as follows:

| Formulation: 7 | |
|---|---|
| PNB | 100 g |
| NaBr salt | 10 g |
| DEG | 90 g |

The above Formulation was prepared by first dissolving sodium bromide in DEG and then adding PNB to sodium bromide solution of DEG. This formulation had conductivity of 798 μs/cm.

To the above conductive medium was added 5.0 grams of DUROGEL and 200 grams of barite, followed by mixing on a Silverson mixer at 8000 rpm for 5 minutes. The following rheologies were measured before and after heat aging at 150° F. for 16 hours.

| | Initial | HA/150° F./16 hours |
|---|---|---|
| PV | 46 | 47 |
| YP | 17 | 16 |
| Gels | | |
| 10 sec | 9 | 9 |
| 10 min | 13 | 10 |
| Conductivity μs/cm | 568 | 649 |

Upon review one of skill in the art should recognize that the above results indicate that conductive fluids useful in the logging of subterranean wells can be prepared using the principles of this invention.

EXAMPLE 9

A fluid illustrative of the present invention was formulated as follows:

| Formulation: 8 | |
|---|---|
| DEG | 45 g |
| 20% Sodium Acetate brine | 5 g |
| DPNB | 150 g |

The above fluid has conductivity of 86 μs/cm. To this fluid was added 5.0 grams DUROGEL and 150 grams of Barite. It was then mixed on a Silverson mixer at 8000 rpm for 5 minutes. The following initial and heat aged (150° F. for 16 hours) properties were measured.

|  | Initial | HA/150° F./16 hours |
|---|---|---|
| PV | 23 | 26 |
| YP | 14 | 12 |
| Gels |  |  |
| 10 sec | 5 | 7 |
| 10 min | 8 | 8 |
| Conductivity $\mu s/cm$ | 103 | 82 |

Upon review one of skill in the art should recognize that the above results indicate that conductive fluids useful in the logging of subterranean wells can be prepared using the principles of this invention.

EXAMPLE 10

A fluid illustrative of the present invention was formulated as follows:

| Formulation: 9 | |
|---|---|
| DEG | 45.0 g |
| 20% Sodium Acetate brine (20% by weight in water) | 5.0 g |
| DPNB | 15.0 g |

The above fluid has conductivity of 17 $\mu s/cm$. To this fluid was added 5.0 grams DUROGEL and 150 grams of Barite. It was then mixed on a Silverson mixer at 8000 rpm for 5 minutes. The following initial and heat aged (150° F. for 16 hours) properties were measured.

|  | Initial | HA/150° F./16 hours |
|---|---|---|
| PV | 32 | 40 |
| YP | 12 | 12 |
| Gels |  |  |
| 10 sec | 4 | 6 |
| 10 min | 7 | 7 |
| Conductivity $\mu s/cm$ | 16.3 | 20.2 |

Upon review one of skill in the art should recognize that the above results indicate that conductive fluids useful in the logging of subterranean wells can be prepared using the principles of this invention.

EXAMPLE 11

An illustrative conductive fluid of this invention was prepared according to the following formulation:

| Formulation 10. | |
|---|---|
| DEG | 90 g |
| Sodium Acetate salt | 10 g |
| DPNB | 100 g |

The above fluid has conductivity of 235 $\mu s/cm$. To this solution was added 7.0 grams DUROGEL and 150 grams of Barite. It was then mixed on a Silverson mixer at 8000 rpm for 5 minutes. The following initial and heat aged properties (150° F. for 16 hours) were measured.

|  | Initial | HA/150° F./16 hours |
|---|---|---|
| PV | 64 | 76 |
| YP | 13 | 10 |
| Gels |  |  |
| 10 sec | 4 | 6 |
| 10 min | 7 | 7 |
| Conductivity $\mu s/cm$ | 194 | 213 |

Upon review one of skill in the art should recognize that the above results indicate that conductive fluids useful in the logging of subterranean wells can be prepared using the principles of this invention.

EXAMPLE 12

The illustrative conductive fluid of this invention was prepared according to the following formulation:

| Formulation 11 | |
|---|---|
| Propylene glycol | 90 g |
| Sodium Acetate salt | 10 g |
| DPNB | 100 g |

The above fluid has conductivity of 388 $\mu s/cm$. To this solution was added 5.0 grams DUROGEL and 150 grams of Barite. The fluid was mixed on a Silverson mixer at 8000 rpm for 5 minutes. The following initial and heat aged (150° F. for 16 hours) properties were measured.

|  | Initial | HA/150° F./16 hours |
|---|---|---|
| PV | 64 | 73 |
| YP | 8 | 9 |
| Gels |  |  |
| 10 sec | 2 | 4 |
| 10 min | 5 | 5 |
| Conductivity $\mu s/cm$ | 238 | 300 |

Upon review one of skill in the art should recognize that the above results indicate that conductive fluids useful in the logging of subterranean wells can be prepared using the principles of this invention.

EXAMPLE 13

The following mud formulations were prepared to demonstrate the utility of glycol ethers of this invention to prepare invert emulsion drilling fluids in a de-ionized water (D.I. water), fresh water (tap water), sea water and 25% $CaCl_2$ brine.

| Formulation | Grams |
|---|---|
| TPND | 177 |
| Lime | 4.0 |
| VG PLUS | 4.0 |

-continued

| Formulation | Grams |
|---|---|
| NOVAMUL | 8.0 |
| VERSAWET | 2.0 |
| Sil Wet - 766 | 2.0 |
| Aqueous Phase | 84 (ml) |
| Barite | 224 |

The above formulations were mixed separately with deionized water (DI water), fresh water, sea water and 25% $CaCl_2$ brine used as aqueous phase. These formulations were heat aged at 150° F. for 16 hours. The following rheologies were measured at room temperature before (Initial) and after heat aging (HA). Conductivity for each sample was measured in microsiemens using a traceable conductivity meter from Fischer Scientific Co.

|  | Mud-12 D.I. Water | | Mud-13 Fresh Water | | Mud-14 Sea Water | | Mud-15 $CaCl_2$ | |
|---|---|---|---|---|---|---|---|---|
|  | Initial | HA | Initial | HA | Initial | HA | Initial | HA |
| E.S. | 17 | 17 | 16 | 18 | 16 | 21 | 35 | 48 |
| Conductivity ($\mu$s/cm) | 6.8 | 5.2 | 7.9 | 6.9 | 8.1 | 5.6 | 2.9 | 2.2 |
| PV | 45 | 56 | 51 | 58 | 50 | 59 | 41 | 58 |
| YP | 9 | 8 | 8 | 9 | 9 | 6 | 38 | 35 |
| Gels |  |  |  |  |  |  |  |  |
| 10 sec | 6 | 7 | 7 | 7 | 7 | 5 | 15 | 16 |
| 10 min. | 8 | 9 | 9 | 10 | 9 | 7 | 20 | 17 |

In view of the above results, one of skill in the art should conclude that one can form invert emulsions with the fluid medium of this invention.

While the compositions and methods of this invention have been described in terms of preferred embodiments, it will be apparent to those of skill in the art that variations may be applied to the process described herein without departing from the concept, spirit and scope of the invention. All such similar substitutes and modifications apparent to those skilled in the art are deemed to be within the spirit, scope and concept of the invention as it is set out in the following claims.

What is claimed is:

1. A method for electrically logging a subterranean well comprising:
   placing into the well a fluid medium, said medium including in the medium's continuous phase an oleaginous fluid, a water soluble alcohol, and an electrolytic salt, said electrolytic salt being present in a concentration so as to permit the electrical logging of the well; and electrically logging said subterranean well.

2. The method of claim 1 wherein said oleaginous fluid comprises a preferentially-oil-soluble glycol.

3. The method of claim 2 wherein the preferentially-oil-soluble glycol is selected from the group consisting of propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof.

4. The method of claim 2 wherein said oleaginous fluid further comprises a component selected from the group consisting of mineral oil, synthetic oil, vegetable oil, silicone oil, and combinations thereof.

5. The method of claim 1 wherein the water soluble alcohol is selected from the group consisting of ethylene glycol, diethylene glycol, triethylene glycol, propylene glycol, butylene glycol, polyethylene glycol, polypropylene glycol, polyethylene-propylene glycol and combinations thereof.

6. The method of claim 1 wherein the electrolytic salt is selected from the group consisting of sodium chloride, sodium bromide, potassium chloride, ammonium chloride, magnesium chloride, calcium chloride, calcium bromide, sodium acetate, potassium acetate, sodium citrate, and combinations thereof.

7. The method of claim 1 wherein the fluid medium further comprises gelling agent and weight material.

8. The method of claim 7 wherein said gelling agent is selected from the group consisting of clays, organophilic clays, polymers, polyamides, polymer emulsions and combinations thereof.

9. The method of claim 7 wherein said weight material is selected from the group consisting of hematite, magnetite, iron oxides, ilmenite, barite, siderite, celestite, dolomite, calcite, manganese oxides, halites and combinations thereof.

10. The method of claim 1 wherein said logging medium further comprises corrosion inhibitor selected from the group consisting of phosphates, silicates, borates, zinc compounds, organic amines, benzoic acid, and benzoic acid derivatives, phosphate esters, heterocyclic nitrogen and sulfur compounds, organic acids and combinations thereof.

11. The method of claim 1 wherein said logging medium further comprises surfactant, emulsifier, wetting agent, fluid loss control agent or combinations thereof.

12. The method of claim 1 further comprising
   drilling said well with an oleaginous-based drilling fluid, and
   displacing said oleaginous-based drilling fluid with said fluid medium so as to enable one to take electrical log measurements of the subterranean well.

13. The method of claim 1 further comprising
   drilling said well with a drilling fluid in which said fluid medium is a component of said drilling fluid, said fluid medium being in sufficient concentration so as to enable one to make electrical log measurements of the subterranean well.

14. A medium for use in taking the electrical log of a subterranean well, said medium comprising a continuous phase, said continuous phase comprising:
   an oleaginous fluid,
   a water soluble alcohol, and
   an electrolytic salt, said salt being in a concentration in said continuous phase so as to permit the electrical logging of a subterranean well.

15. The medium of claim 14 wherein said oleaginous fluid comprises a preferentially-oil-soluble glycol.

16. The medium of claim 15 wherein said preferentially-oil-soluble glycol is selected from the group consisting of propylene glycol n-butyl ether; dipropylene glycol n-butyl ether; tripropylene glycol n-butyl ether; tetrapropylene glycol n-butyl ether; pentapropylene glycol n-butyl ether; hexapropylene glycol n-butyl ether; heptapropylene glycol n-butyl ether, the analogous tert-butyl ethers and combinations thereof.

17. The medium of claim 15 wherein said oleaginous fluid further comprises a component selected from the group consisting of mineral oil, synthetic oil, vegetable oil, silicone oil, and combinations thereof.

18. The medium of claim 14 wherein said water soluble alcohol is selected from the group consisting of ethylene glycol, diethylene glycol, triethylene glycol, propylene glycol, butylene glycol, polyethylene glycol, polypropylene glycol, polyethylene-propylene glycol and combinations thereof.

19. The medium of claim 14 wherein said electrolytic salt is selected from the group consisting of sodium chloride, sodium bromide, potassium chloride, ammonium chloride, magnesium chloride, calcium chloride, calcium bromide, sodium acetate, potassium acetate, sodium citrate, and combinations thereof.

20. The medium of claim 14 further comprising gelling agent and weight material.

21. The medium of claim 20 wherein the gelling agent is selected from the group consisting of clays, organophilic clays, polymers, polyamides, polymer emulsions and combinations thereof.

22. The medium of claim 20 wherein the weight material is selected from the group consisting of hematite, magnetite, iron oxides, ilmenite, barite, siderite, celestite, dolomite, calcite, magnesium oxides, halites and combinations thereof.

23. The medium of claim 14 further comprising a corrosion inhibitor selected from the group consisting of phosphates, silicates, borates, zinc compounds, organic amines, benzoic acid, and benzoic acid derivatives, phosphate esters, heterocyclic nitrogen and sulfur compounds, organic acids and combinations thereof.

24. The medium of claim 14 further comprising surfactant, emulsifier, wetting agent, fluid loss control agent or combinations thereof.

* * * * *

UNITED STATES PATENT AND TRADEMARK OFFICE
CERTIFICATE OF CORRECTION

PATENT NO. : 6,029,755

DATED : February 29, 2000

INVENTOR(S) : Arvind D. Patel

It is certified that error appears in the above-identified patent and that said Letters Patent is hereby corrected as shown below:

On the title page, Item [56] insert the reference cited:

| | | |
|---|---|---|
| 97/103313 | 03/1997 | WIPO |
| 902,076 | 03/1999 | European Patent Office |

Signed and Sealed this

Fifth Day of September, 2000

Attest:

Attesting Officer

Q. TODD DICKINSON

*Director of Patents and Trademarks*

UNITED STATES PATENT AND TRADEMARK OFFICE
CERTIFICATE OF CORRECTION

PATENT NO. : 6,029,755
DATED : February 29, 2000
INVENTOR(S) : Arvind D. Patel

It is certified that error appears in the above-identified patent and that said Letters Patent is hereby corrected as shown below:

In Column 8, line 47, delete "DBG" and insert -- DEG --

In Column 10, line 17, delete "DBG" and insert -- DEG --

In Column 11, line 17, delete "24" and insert -- 34 --

Signed and Sealed this

Nineteenth Day of December, 2000

Attest:

Q. TODD DICKINSON

Attesting Officer

Commissioner of Patents and Trademarks